No. 791,350. PATENTED MAY 30, 1905.
R. MACRAE.
STORAGE BATTERY.
APPLICATION FILED AUG. 4, 1904.
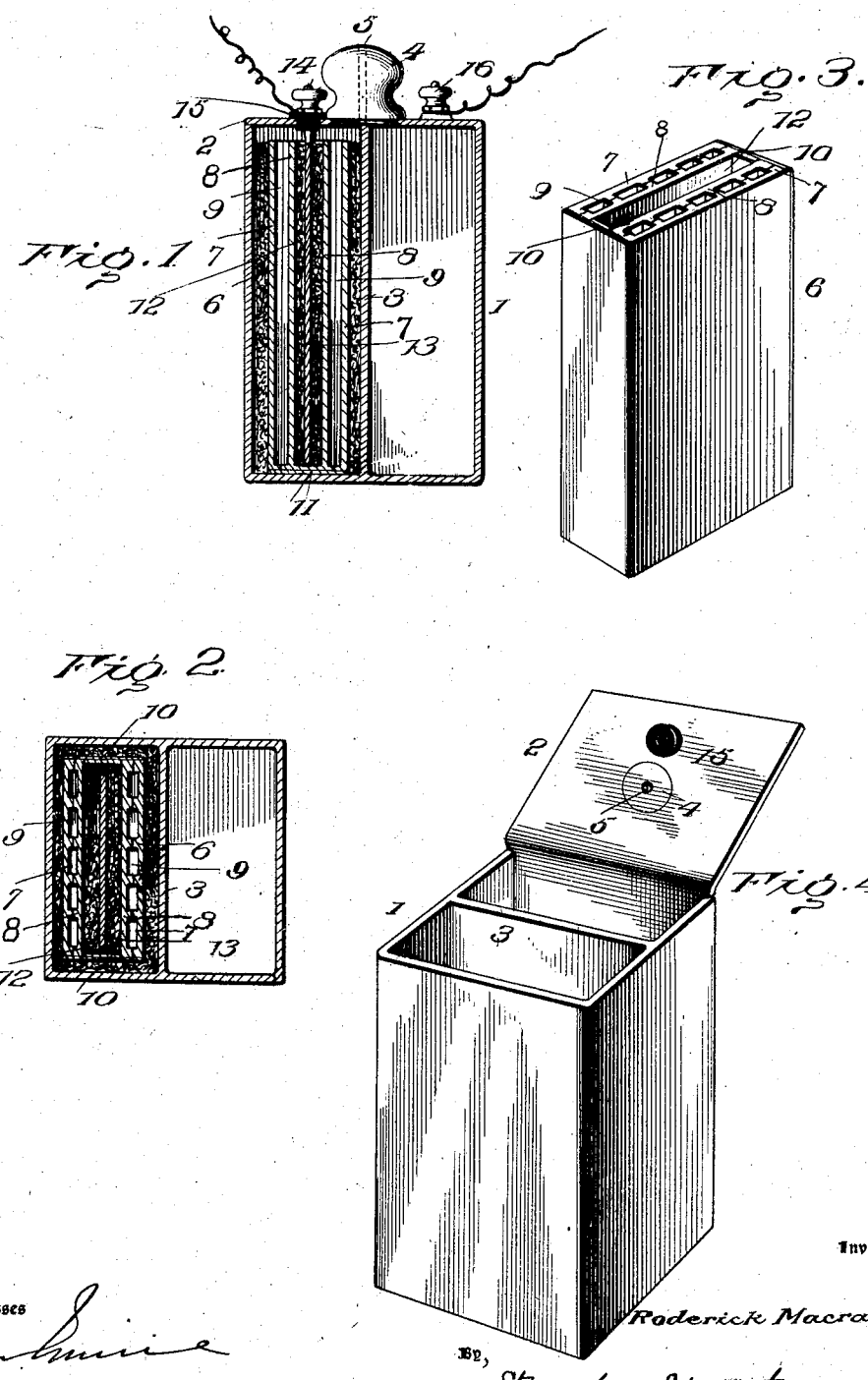
Witnesses
Inventor
Roderick Macrae.
By,
Stewart & Stewart.
Attorneys No. 791,350. Patented May 30, 1905.

UNITED STATES PATENT OFFICE.

RODERICK MACRAE, OF CHICAGO, ILLINOIS.

STORAGE BATTERY.

SPECIFICATION forming part of Letters Patent No. 791,350, dated May 30, 1905.

Application filed August 4, 1904. Serial No. 219,563.

*To all whom it may concern:*

Be it known that I, RODERICK MACRAE, a citizen of Great Britain, and a resident of Chicago, Illinois, have invented certain new and useful Improvements in Storage Batteries, of which the following is a specification.

My invention relates to certain new and useful improvements in storage batteries, and particularly to that class of batteries in which the positive-pole electrode is inclosed in a container which is in the form of a porous cup.

The object of my invention is to improve the structure of the battery, and particularly the construction of the container for the positive-pole electrode.

With these objects in view my invention consists in forming the container with double walls, the interior of the container holding one active element, the other active element being without the container and the container between its walls being filled with acid or other electrolyte.

My invention also consists in making the container of a yielding or elastic material, such as wood, which will not break when the battery is subjected to heavy blows, as is the case with a porous container made of terra-cotta or the like.

Referring to the drawings, where the same part is designated by the same reference-numeral wherever it occurs, Figure 1 is a sectional view of a storage-battery unit embodying my invention. Fig. 2 is a cross-sectional view of Fig. 1. Fig. 3 is a perspective view of the container of the positive-pole electrode, and Fig. 4 is a perspective view of the casing of the unit.

1 designates a casing, which is preferably made of lead and, as shown, is in the form of a rectangular box provided with a cover 2 and a partition 3, dividing the box into two cells. It is to be understood that the form of box or the number of cells into which the box is divided is entirely immaterial, and, if desired, the box may contain but a single cell.

4 is a knob secured on the cover of the box, by which the cover may be raised. This knob is preferably provided with a perforation 5, by which the interior of the box is vented.

6 designates the container of the positive-pole electrode and is in the form of a porous cup. The container is formed with double walls, between which there is a space adapted to receive the acid or other electrolyte. Practically speaking, this container is in the form of a pair of porous cups one located within the other, with a space between the cups.

Referring now to the drawings, where I show the preferred form of my container, the container is made in the form of a box in which the side walls are made double, each being composed of the strips 7 and 8, the adjacent faces of the strips being provided with the channels 9, cut therein, so that when the strips 7 and 8 are placed together with the channels facing each other cells are formed in the side walls, in which sulfuric acid or other electrolyte may be placed. The side walls 7 and 8 are secured together in any suitable way, as by a cement which is not affected by the acid or electrolyte used in the body.

10 10 are strips inserted between the side walls of the box to form the end walls of the box, and 11 17 are strips forming the bottom of the box. Preferably the side walls and bottom are secured to the end walls by cement, as previously described. Between the inner side walls of the box the chamber 12 is formed, in which is placed the positive-pole electrode.

While I have described only the side walls of the container as being double, it is evident that the end walls and bottom may also be made double, if desired, in which case two entirely separate containers would be formed, held away from each other in any suitable manner.

In forming a cell a container 6 is placed in each section of the box 1 and the space between the outer wall of the container and the walls of the box filled with the active material. The conducting-plate 13 is then inserted in the chamber 12 of the container and the space between the plate 13 and the inner walls of the container is filled with active material, care being taken that none of it gets into the openings 9. When now the space or spaces between the walls of the container are filled with acid, the battery is ready for charging.

The conducting-plate is provided with a projection 14, extending up to the cover 2 of the box and insulated from the cover by the insulation 15, placed around the projection between it and the cover. I have shown the projection 14 in the form of a binding-post, by which a wire may be connected to the projection.

16 is a binding-post secured to the top 2, forming the negative pole of the circuit.

By the use of a porous container formed from material which is elastic, such as wood, a battery is produced which is particularly well adapted for use in automobiles, as the container will not break, as it would if formed of terra-cotta or similar substance.

While I have described what I believe to be the preferred form of my invention, I desire to have it understood that I am not to be limited to any particular form of container for the positive element, as any container which has one or more double walls comes within my invention.

By the term "elastic" I mean to distinguish a container made of wood or similar material which will yield or bend without breaking and a container formed of terra-cotta or the like which is fragile and easily broken.

What I claim as new, and desire to secure by Letters Patent, is—

1. In a storage battery, a container composed of two porous cups, one located within the other, the inner cup being filled with active material and the outer cup between its inner wall and the walls of the inner cup with an electrolyte, the outer cup being coated upon its exterior with active material.

2. In a storage battery, a double-walled porous container having its interior filled with active material, the interspace between the walls filled with an electrolyte and having its exterior coated with active material.

3. In a storage battery, a container composed of two porous cups formed of elastic material, one smaller than the other, the smaller one resting within the larger one, the smaller one being filled with active material and the interspace between the cups being filled with an electrolyte, the outer cup being coated with active material upon the exterior, substantially as described.

4. In a storage battery, a container composed of two porous cups formed of elastic material, one smaller than the other, the smaller one resting within the larger one, the smaller one being filled with active material and the interspace between the cups being filled with an electrolyte, the outer cup being coated with active material upon the exterior, a conductor in contact with the active material of the inner cup, and a conductor in contact with the active material of the outer cup.

5. In a storage battery, a container composed of two porous cups of elastic material, one smaller than the other, and the smaller one rested within the larger one, the smaller one being filled with active material and the interspace between the cups being filled with an electrolyte, the outer cup being coated with active material upon the exterior, a conductor in contact with the active material of the inner cup, and a metallic casing inclosing the active material of the outer cup, which forms one of the terminals of the cell.

6. In a storage battery, the combination of a conducting-casing, a porous double-walled acid-containing container located within the conducting-casing and a conducting-plate located within the porous container, the space between the conducting-casing and the porous container being filled with active material, and the space between the conducting-plate and the porous container being filled with active material, the space between the double walls of the porous container being filled with an electrolyte.

7. In a storage battery, a double-walled porous container having its interior filled with active material in which is located a conductor and having its exterior coated with active material in which is located a conductor, the interspaces of the container being filled with an electrolyte.

8. In a storage battery a porous container having one of its walls double with a space between the parts forming the double wall, the container having its interior filled with active material, the interspace between the parts forming the double wall being filled with an electrolyte and having its exterior coated with active material.

9. In a storage battery a porous container having its side walls double with a space between the parts forming the double walls, the container having its interior filled with active material, the interspaces between the parts forming the double walls being filled with an electrolyte and having its exterior coated with an active material.

Signed by me at Chicago, Illinois, this 25th day of July, 1904.

RODERICK MACRAE.

Witnesses:
OLIVE M. HULSE,
K. L. BLADE.